US008593708B2

(12) United States Patent
Monga et al.

(10) Patent No.: US 8,593,708 B2
(45) Date of Patent: Nov. 26, 2013

(54) METHODS, SYSTEMS AND APPARATUS FOR JOINTLY OPTIMIZING NODE LOCATIONS AND CORRESPONDING OUTPUT VALUES OF A COLOR LOOK-UP-TABLE (LUT)

(75) Inventors: Vishal Monga, Webster, NY (US); Raja Bala, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 654 days.

(21) Appl. No.: 12/724,107

(22) Filed: Mar. 15, 2010

(65) Prior Publication Data
US 2011/0222080 A1 Sep. 15, 2011

(51) Int. Cl.
*G03F 3/08* (2006.01)

(52) U.S. Cl.
USPC ........... 358/523; 358/1.9; 358/3.26; 358/518; 358/520; 358/525

(58) Field of Classification Search
USPC .......................................... 358/1.9, 518–533
See application file for complete search history.

(56) References Cited

U.S. PATENT DOCUMENTS

| | | | |
|---|---|---|---|
| 5,649,072 A | 7/1997 | Balasubramanian | |
| 6,118,549 A * | 9/2000 | Katougi et al. | 358/1.9 |
| 6,266,165 B1 * | 7/2001 | Huang et al. | 358/520 |
| 6,360,007 B1 * | 3/2002 | Robinson et al. | 382/162 |
| 6,731,796 B2 * | 5/2004 | Maltz et al. | 382/167 |
| 7,345,787 B2 * | 3/2008 | Ito et al. | 358/1.9 |
| 7,933,053 B2 * | 4/2011 | Dalal et al. | 358/518 |
| 2004/0169889 A1 * | 9/2004 | Sawada | 358/2.1 |
| 2004/0234127 A1 * | 11/2004 | Arai et al. | 382/167 |
| 2004/0263882 A1 * | 12/2004 | Ito et al. | 358/1.9 |
| 2006/0193018 A1 * | 8/2006 | Ito et al. | 358/518 |
| 2009/0067017 A1 | 3/2009 | Monga et al. | |

OTHER PUBLICATIONS

R. Bala, "Device Characterization," *Digital Color Imaging Handbook*, Chapter 5, CRC Press, 2003.
R. Bala, R. V. Klassen, "Efficient Color Transformation Implementation," *Digital Color Imaging Handbook*, Chapter 11, CRC Press, 2003.
J. Max, "Quantizing for Minimum Distortion," IEEE Trans. Inform Theory, vol. IT-6, pp. 7-12, 1960.
C. G. Atkeson, A. W. Moore and S. Schaal, "Locally Weighted Learning," *Artificial Intelligence Review*, 1997, pp. 1-52.
E. Chong, S. Zak, "An Introduction to Optimization," $2^{nd}$ Ed, Wiley, 2001.
Chang et al., "Sequential Linear Interpolation of Multidimensional Functions," IEEE, vol. 6, No. 9, Sep. 1997, pp. 1231-1245.
Peter Hemingway, "n-Simplex Interpolation," HP Laboratories Bristol, HPL-2002-320, Nov. 20, 2002, cover page and pp. 1-8.
International Color Consortium, "Introduction to the ICC Profile Format," web page, 4 pages http://www.color.orq/iccprofile.xalter, Mar. 12, 2010.

(Continued)

*Primary Examiner* — Richard Zhu
(74) *Attorney, Agent, or Firm* — Fay Sharpe LLP (57) ABSTRACT

This disclosure provides methods, systems and apparatus for jointly optimizing node locations and corresponding output value of a color look-up-table (LUT) associated with an imaging device. According to one exemplary method, initially a set of LUT node locations are generated by solving a first optimization problem and subsequently, a set of LUT node values are generated by solving a second optimization problem.

18 Claims, 7 Drawing Sheets

(56) References Cited

OTHER PUBLICATIONS

Monga et al., "Sort-Select-Damp: An Efficient Strategy for Color Look-Up Table Lattice Design," 16th Color Imaging Conference Final Program and Proceedings, pp. 247-253, 2008 Society for Imaging Science and Technology.

M.J. Baines, "On Algorithms for Best $L_2$ Fits to Continuous Functions with Variable Nodes," Numerical Analysis Report 1/93, Reading, UK, 39 pages.

* cited by examiner

METHODS, SYSTEMS AND APPARATUS FOR JOINTLY OPTIMIZING NODE LOCATIONS AND CORRESPONDING OUTPUT VALUES OF A COLOR LOOK-UP-TABLE (LUT)

BACKGROUND

This disclosure relates to the art of color image processing, more specifically, the presently disclosed methods, systems and apparatus provide for the selection of node locations and associated node values for a multi-dimensional color transformation LUT, based upon a joint optimization approach.

An image prepared for rendering on an electronic device is represented by a set of pixels that each describes a small portion of the image in terms of digital values that represent the colorants available to the rendering device. For example, in an image prepared for display on a video monitor, each pixel typically describes the intensity of the red (R), green (G) and blue (B) components of light that are illuminated to reproduce the color at the associated region of the screen. Similarly, in an image prepared for rendering on a printing device operating in a CMYK color space, each pixel describes the amount of cyan (C), magenta (M), yellow (Y) and black (K) colorants to be applied to the print medium in order to reproduce the color at the associated region of the rendered image.

In an 8-bit system, the pixel value for each colorant can range from 0 to 255, with 255 representing the maximum or fully saturated amount of colorant, For an RGB color space, for example, fully saturated red is represented by the pixel value R=255, G=0, B=0 and ideally, a printer operating in a CMYK color space, for example, would reproduce the fully saturated red in response to the pixel value C=0, M=255, Y=255, K=0. In other words, the magenta and yellow colorants, when combined through simple subtractive mixing, would be perceived as red.

However, the spectral properties of the red phosphor used in the video monitor typically differ from those of the subtractively mixed magenta and yellow colorants of a particular printer. As a result, the visual appearance of the red described in RGB space and displayed on the video monitor will usually not match that of the red described in CMYK space and printed on a page. Further, even when rendered on different devices of the same type (e.g., two CMYK printers), the colors reproduced in response to the same color value (e.g., CMYK) will often differ in visual appearance. Accordingly, color transformations are typically required when color matching between two rendering devices is required. In the example described above, the saturated red pixel with RGB color value 255, 0, 0 may be mapped to a CMYK printer pixel that represents, for example, magenta and/or yellow that is less than fully saturated and also calls for a small cyan component, e.g., C=27, M=247, Y=255, K=0.

Color transformations are often complex, multidimensional functions that correct for the nonlinear behavior of both digital color devices and the human visual system, which would require a significant amount of memory in order to process large images in real-time. To reduce the computational cost, these functions are typically implemented as multidimensional lookup tables (LUTs). Conventionally, a LUT is essentially a rectangular grid or lattice that spans the input color space of the transform. Output values corresponding to each node, i.e., intersection point, of the grid are pre-computed and stored in the LUT. Input colors are processed through the LUT by i) retrieving the cell to which the input color belongs, and ii) performing an interpolation among a subset of the surrounding cell vertices to compute the output color value.

The accuracy of the LUT is directly proportional to the density of the lattice, or equivalently, the overall size of the LUT. However the size of a LUT is typically limited by the amount of available processor RAM and cache memory. Accordingly, LUTs are built with an input node sampling that attempts to maximize transform accuracy subject to these hardware-imposed constraints on LUT size. For example, while a 24-bit RGB vector would be capable of describing over 16 million colors, it would not be unusual for the corresponding RGB-to-CMYK LUT to be partitioned into 16.times.16.times.16 (4096) table locations or nodes, with one CMYK value stored at each node. CMYK values of points not directly represented by nodes are then determined by interpolation among nodes or some other suitable calculation and thus, the issue of "node placement" becomes very important.

Thus both the locations of the nodes in the input space, and the output values stored at these nodes contribute to overall LUT accuracy. In spite of this significance, however, input nodes are often positioned on a uniformly spaced rectangular lattice with no regard to the characteristics of the color transform. More sophisticated techniques attempt to adapt node locations to transform characteristics such as transform curvature, however no known attempt has been made to simultaneously optimize node locations and values.

INCORPORATION BY REFERENCE

R. Bala, "DEVICE CHARACTERIZATION," *Digital Color Imaging Handbook*, Chapter 5, CRC Press, 2003.

R. Bala, R. V. Klassen, "EFFICIENT COLOR TRANSFORMATION IMPLEMENTATION," *Digital Color Imaging Handbook*, Chapter 11, CRC Press, 2003.

Monga et al., "INPUT-ADAPTIVE METHOD FOR COLOR TABLE LOOKUP," U.S. Patent Application Publication No. 2009/0067017, published Mar. 12, 2009.

T. Balasubramanian, "ITERATIVE TECHNIQUE FOR REFINING COLOR CORRECTION LOOK-UP TABLES," U.S. Pat. No. 5,649,072, issued Jul. 15, 1997.

J. Max, "QUANTIZING FOR MINIMUM DISTORTION," IEEE Trans. Inform Theory, Volume IT-6, pp. 7-12, 1960.

C. G. Atkeson, A. W. Moore and S. Schaal, "LOCALLY WEIGHTED LEARNING," *Artificial Intelligence Review*, 1997.

E. Chong, S. Zak, "AN INTRODUCTION TO OPTIMIZATION," $2^{nd}$ Ed, Wiley, 2001.

BRIEF DESCRIPTION

In one embodiment of this disclosure, described is a method of generating a multidimensional LUT (look-up-table) representing a color transformation function associated with an imaging device, the method comprising a) generating a set of LUT node locations by solving a first optimization problem to minimize a first defined error criterion calculated over a set of training samples associated with the color transformation function; and b) generating a set of LUT node values associated with their respective LUT node locations by solving a second optimization problem to minimize a second defined error criterion calculated over the set of training samples, the second error criterion accounting for one or more interpolation processes associated with determining LUT values at LUT non-nodal locations.

In another embodiment of this disclosure, described is a printing apparatus comprising an image marking device; a controller operatively connected to the image marking device, the controller configured to access a multidimensional LUT representing a color transformation function associated with rendering an image on the image marking device, wherein the multidimensional LUT is generated by a process comprising a) generating a set of LUT node locations by solving a first optimization problem to minimize a first defined error criterion calculated over a set of training samples associated with the color transformation function; and b) generating a set of LUT node values associated with their respective LUT node locations by solving a second optimization problem to minimize a second defined error criterion calculated over the set of training samples, the second error criterion accounting for one or more interpolation processes associated with determining LUT values at LUT non-nodal locations.

In still another embodiment of this disclosure, described is a computer program product comprising a computer-usable data carrier storing instructions that, when executed by a computer, cause the computer to perform a process of generating a multidimensional LUT representing a color transformation function associated with an imaging device, the process comprising a) generating a set of LUT node locations by solving a first optimization problem to minimize a first defined error criterion calculated over a set of training samples associated with the color transformation function; and b) generating a set of LUT node values associated with their respective LUT node locations by solving a second optimization problem to minimize a second defined error criterion calculated over the set of training samples, the second error criterion accounting for one or more interpolation processes associated with determining LUT values at LUT non-nodal locations.

DETAILED DESCRIPTION

As briefly previously discussed in the Background, LUTs are often used to efficiently store and represent complex multi-dimensional color transforms. Practical examples include ICC profiles and color transformations stored on a chip. The classical approach to LUT design involves a uniform partitioning of the input color space into uniformly spaced nodes and storing the true color transform value at the nodes. Research in recent years has observed the value of adapting node locations so as to adapt to transform curvature and proposed efficient algorithms to achieve the same. Likewise, it has been observed for over a decade that carefully selecting output values at any set of fixed node locations with the knowledge of the underlying interpolation employed in the LUT can reduce interpolation error over the input space.

This disclosure provides methods, systems and apparatus to optimize a LUT-based color transform by optimizing both LUT node locations and node values to reduce/minimize the overall interpolation error. In a first embodiment (referred to as "SOLVE") a greedy algorithm is used to place node locations at a density that is proportional to function curvature. Node values at these locations are then determined by solving a least-squares problem to minimize mean-squared error. In a second embodiment (referred to as "RESOLVE"), the first embodiment is used to seed an iterative process that alternates between optimizing node location and node value until a chosen termination condition is met. The "SOLVE" embodiment shows considerable improvement in approximation accuracy when compared to techniques that employ only node location or node value optimization.

By way of additional introductory matter, device image processing pipelines, such as those in a digital camera or printer often entail the application of color transformations to images and objects. These transformations are complex non-linear functions making it impractical to process large images in real-time. It is therefore common to implement such mathematical transforms via multidimensional look-up-tables (LUTs). For purposes of this detailed disclosure and the claims which follow, the term imaging device includes image output devices, such as printers, monitors, etc., and includes devices such as scanners, digital cameras and other image processing devices.

The most general definition of a color LUT is a sparse data structure that maps a multi-dimensional input color variable to another multi-dimensional output color variable by storing a cleverly sampled subset of all possible color inputs (and corresponding outputs) from a multi-dimensional space. The qualifier "sparse" is of paramount significance here. Well known device color spaces such as RGB, CMYK as well as perceptually significant device independent color spaces such as CIELAB (see R. Bala, "DEVICE CHARACTERIZATION," *Digital Color Imaging Handbook*, Chapter 5, CRC Press, 2003) are ≥3 dimensions with each dimension requiring a bit-depth of 8 bits or higher for adequate representation. A 16 bit per separation, full-resolution CMYK→CIELAB LUT will therefore need $2^{16 \times 4}$=16 GB of storage. For most applications, processor RAM and cache memory constraints render storage of such full-resolution LUTs impractical. Further, the dimensionality of color devices is likely to increase in the future with devices employing more than 3 or 4 colors, e.g. 6 and higher colorant printing (see R. Bala, R. V. Klassen, "EFFICIENT COLOR TRANSFORMATION IMPLEMENTATION," *Digital Color Imaging Handbook*, Chapter 11, CRC Press, 2003).

Hence real-world color look-up-tables are built with a sparser sampling of the input color space where the sampled values are referred to as the "nodes". Efficient interpolation models (see Monga et al., "INPUT-ADAPTIVE METHOD FOR COLOR TABLE LOOKUP," U.S. Patent Application Publication No. 2009/0067017, published Mar. 12, 2009) are used to determine output values corresponding to input color variables that do not coincide with the nodes of the color LUT. The problem of "node selection" for color LUTs has been extensively researched. To some extent, the problem may be likened to quantization where once again an optimal partitioning of the input color space is desired to approximate a range of colors via a reduced palette. The crucial difference is in the optimization cost function. For color LUT design, it is desired to optimize the partitioning or equivalently node selection so as to effectively approximate a multi-dimensional color transform processed through the LUT. The curvature of the transform hence plays a dominant role. As prior work has shown, truly optimal node selection in multiple-dimensions reduces to problems that are computationally infeasible. Much attention has hence been devoted to sub-optimal and practical algorithms (see T. Balasubramanian, "ITERATIVE TECHNIQUE FOR REFINING COLOR CORRECTION LOOK-UP TABLES," U.S. Pat. No. 5,649,072, issued Jul. 15, 1997 and J. Max, "QUANTIZING FOR MINIMUM DISTORTION," IEEE Trans. Inform Theory, Volume IT-6, pp. 7-12, 1960) that trade-off complexity vs. quality of approximation (see C. G. Atkeson, A. W. Moore and S. Schaal, "LOCALLY WEIGHTED LEARNING," *Artificial Intelligence Review*, 1997).

A slightly less explicitly investigated aspect of color LUT design is the problem of output value optimization. That is, while storing the exact value of the multi-dimensional color transform will lead to zero error at the nodes of the LUT, in an expected sense the error may still be a lot higher as contributed by input color values whose output is determined via an interpolation. It is therefore desirable to optimize the output transform values at these node locations so as to minimize error over a statistically representative training set of input colors under a given model of color interpolation.

While the two problems of node location vs. node value optimization have been investigated individually, this disclosure, and the exemplary embodiments provided herein demonstrate that significant benefits are made by their joint exploitation. Established first is the fundamental difficult task of formulating a cost function which is to be minimized as a function of node locations as well as output values. To make the problem tractable the case of simplex interpolation in arbitrary dimensions is particularly analyzed. This allows mapping the set of multi-dimensional node locations to a (constrained) weight matrix which manifests itself in an attractive analytical form in the cost function. It is then observed that the cost function of interest is not jointly convex over the weight matrix induced by the node locations and the multi-dimensional variable of node values. This inhibits the direct application of standard numerical techniques in convex optimization (E. Chong, S. Zak, "AN INTRODUCTION TO OPTIMIZATION," $2^{nd}$ Ed, Wiley, 2001). The cost function however exhibits separable convexity as a function of the vector of the node output values for a fixed weight matrix (node locations), and vice-versa. This disclosure then provides an iterative algorithm called RESOLVE (RE-peated Sequential Optimization of Node Location and ValuE) which involves repeated solving of constrained and unconstrained convex problems in an alternating manner. Experimental results for the problem of designing a CMYK→CIELAB LUT for a color xerographic printer show dramatic improvements in approximation accuracy by the proposed algorithmic framework over individual optimization of node locations or output values.

Now is provided a more detailed description of LUTs as applied to color transformations and exemplary embodiments of this disclosure. As previously mentioned, color transforms often manifest as complex functions mapping one multidimensional color space to another. A classic example is a printer characterization function that maps between device (e.g. CMYK) colorant space and colorimetric (e.g. CIELAB) space. (See R. Bala, "DEVICE CHARACTERIZATION," *Digital Color Imaging Handbook*, Chapter 5, CRC Press, 2003.) The execution of such complex functions on large quantities of image data in real-time continues to be computationally prohibitive. One solution to this problem is to approximate the multidimensional lookup table (LUT). In a classic LUT design, a regular lattice of LUT nodes is specified in the input space. This is shown in FIG. 1 for a 3D lattice in CIELAB space.

Figure 1:
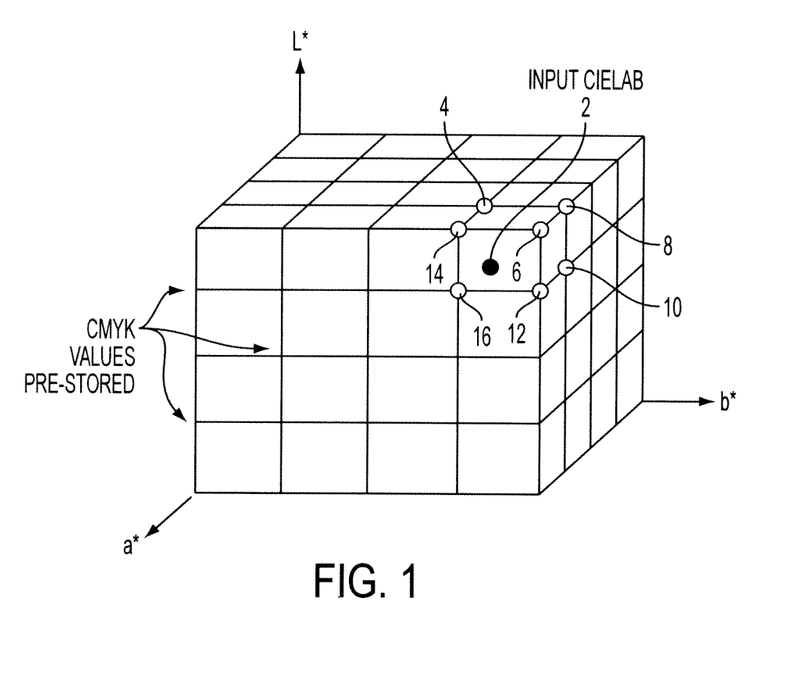
FIG. 1 illustrates schematically a LUT interpolation on a 3-D surface for a transformation from CIE LAB to CMYK.

Illustrated also in FIG. 1 is a LUT interpolation on a 3D lattice for a transformation from CIELAB to CMYK. Specifically, an interpolation process is performed on an input CIELAB to provide a CMYK value.

At each lattice intersection point, or node, the true color transformation is computed and stored a priori. In real-time execution, the color transformation for an arbitrary input color 2 is obtained by interpolating among the pre-computed transform values at surrounding nodes 4, 6, 8, 10, 12, 14 and 16. The rationale is that the interpolation generally requires far fewer computations than the original color transform. Different lattice and node interpolation geometries are described in R. Bala, R. V. Klassen, "EFFICIENT COLOR TRANSFORMATION IMPLEMENTATION," *Digital Color Imaging Handbook*, Chapter 11, CRC Press, 2003. A common technique is simplex interpolation, which requires the fewest number of mathematical operations among standard lattice-based interpolation techniques. In 3 dimensions, simplex interpolation is referred to as tetrahedral interpolation (see R. Bala, R. V. Klassen, "EFFICIENT COLOR TRANSFORMATION IMPLEMENTATION," *Digital Color Imaging Handbook*, Chapter 11, CRC Press, 2003). In one dimension, the common interpolation techniques all reduce to piecewise-linear interpolation.

Figure 2:
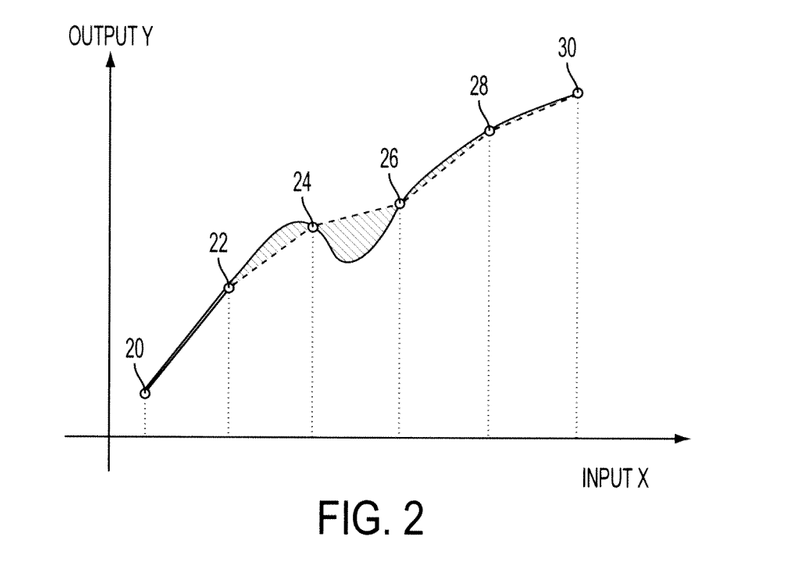
FIG. 2 illustrates a piecewise linear interpolation of a function using node values that coincide with function values using uniform node spacing adapted to the function curvature.
Figure 3:
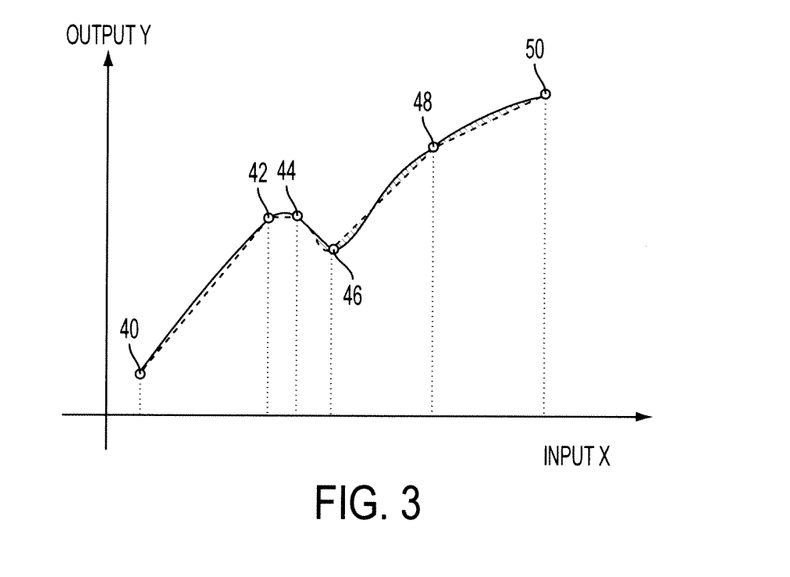
FIG. 3 illustrates a piecewise linear interpolation of a function using node values that coincide with function values using a non-uniform node spacing approach adapted to the function curvature.

The aforementioned interpolation operation will introduce an error. This is most easily illustrated in a 1-D example, as shown in FIGS. 2 and 3. Illustrated in FIGS. 2 and 3 is a piecewise linear interpolation of a function using node values that coincide with function values, with (FIG. 2) uniform node spacing, and (FIG. 3) non-uniform node spacing adapted to function curvature. With reference to FIG. 2, the original function is drawn by a solid curve. It is sampled to form nodes at equal intervals (circles), and approximated by a piecewise linearly interpolated function (shown by a dotted line). The values at nodes 20, 22, 24, 26, 28 and 30 coincide with the function values. The shaded areas provide a sense for the approximation error, or the difference between the original and interpolated functions.

As can be seen from FIG. 2, there are clearly opportunities to reduce the approximation error. One trivial solution is to simply increase the number of nodes which asymptotically yields to a zero approximation error. However, the number of nodes poses a cost to the color management system by way of storage and memory. For the ensuing discussion, it is assumed a fixed number of nodes are used.

Another approach is to optimize the spacing among the nodes. Since the interpolation is piecewise linear, intuition indicates that nodes should be placed more densely in regions where the function exhibits high curvature, and sparsely where the function exhibits low curvature (or strong linearity). Such an approach results in an approximation as shown in FIG. 3, where nodes 40, 42, 44, 46, 48 and 60 coincide with the function values. Qualitatively, it can readily be seen that the approximation error has been reduced. Notably, mathematically the formulation and solution of a global optimization is non-trivial, especially in higher dimensions. However, approximate greedy techniques based on local curvature, or more generally an "importance function" can be devised. One example is the "Select-Sort-Damp" (or SSD) algorithm disclosed in Monga et al., "INPUT-ADAPTIVE METHOD FOR COLOR TABLE LOOKUP," U.S. Patent Application Publication No. 2009/0067017, published Mar. 12, 2009.

Figure 4:
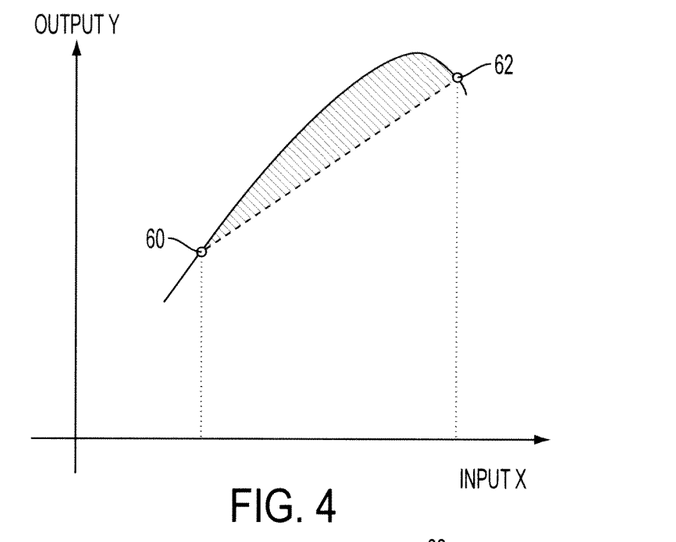
FIG. 4 illustrates a piecewise linear interpolation of a function with node values chosen to coincide with function values.
Figure 5:
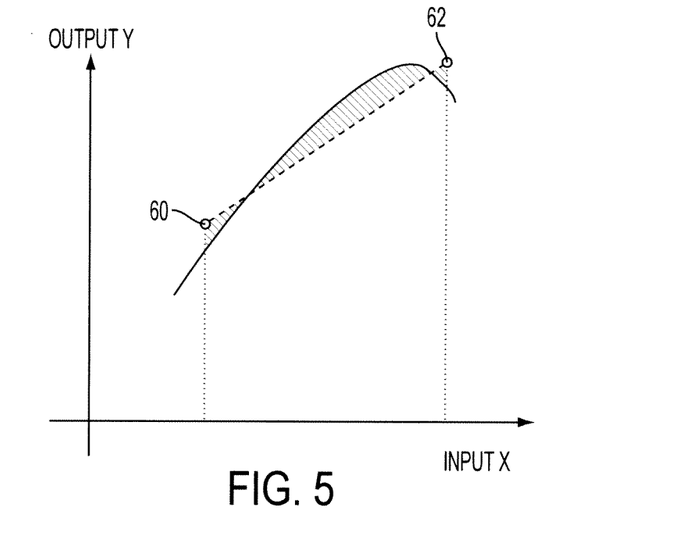
FIG. 5 illustrates a piecewise linear interpolation of a function with node values chosen to minimize an overall error criterion for arbitrary input samples.

Another consideration is how the node values are derived. Thus far, the node values are obtained by evaluating the original function at the node locations. While this produces zero approximation error at the nodes, it is not necessarily the optimal strategy for arbitrary inputs x. This is illustrated in FIGS. 4 and 5 for a pair of nodes 60 and 62 chosen to either coincide with function values or to minimize error for colors in-between the nodes. The concept of deriving node values to minimize the interpolation error for arbitrary training samples is taught in T. Balasubramanian, "ITERATIVE TECHNIQUE FOR REFINING COLOR CORRECTION LOOK-UP TABLES," U.S. Pat. No. 5,649,072, issued Jul. 15, 1997.

Illustrated in FIGS. 4 and 5 is a piecewise linear interpolation of a function, with node values chosen to (FIG. 4) coincide with function values and (FIG. 5) minimize an overall error criterion for arbitrary input samples.

If the error criterion is mean squared error, then it is in fact possible to obtain an optimal set of node values by solving a well-posed least-squares problem. This is discussed in greater detail below.

While prior art has focused on solving for either node location or node value, disclosed is an approach that combines both concepts and attempts to optimize both node location and value to minimize a chosen error criterion. A truly joint optimization of LUT interpolation error as a function of LUT node locations and values is a complex and generally intractable problem. As a practical, yet highly effective alternative, one exemplary embodiment disclosed provides a sequential alternating algorithm for solving for node locations and node values in turn. This is akin to the iterative Lloyd-Max algorithm used for optimizing quantizers. (See J. Max, "QUANTIZING FOR MINIMUM DISTORTION," IEEE Trans. Inform Theory, Volume IT-6, pp. 7-12, 1960.)

LUT Design Algorithm
Notation and Problem Set-Up

In this discussion, the goal is to optimize a LUT that employs simplex interpolation in n-dimensions. For generality, it is not required that the LUT nodes lie on a regular lattice. The input to the algorithm includes a training set S of multi-dimensional inputs and outputs obtained from the "true" color transform f( ) where S is given by:

$$S=\{x_i, y_i\}, i=1,2,\ldots T$$

$$x_i \in R^n, y_i \in R$$

The key requirement of the training set is that it should be a large enough sampling of the input color space and carefully chosen to adequately represent transform characteristics. Also, note that the above notation implicitly assumes that color transforms are $R^n \to R$ maps—this is not a conceptual restriction but rather merely for ease of exposition and notational convenience as will be apparent in the following description. An $R^n \to R^m$ map can be seen as a concatenation of m $R^n \to R$ mappings.

In the ensuing discussion, a multi-dimensional input color that forms a node of the look-up-table will be denoted as $x_j^{nd}$ j=1,2,..., M. Let $X^{nd}$ denote the set of the M input nodes, and the corresponding output node values as $y_j^{nd}$ which may be collected (using an appropriate ordering) into a vector of output node-values $y^{nd}$.

As previously discussed, both the node location in the input-space as well as the corresponding output node values affect the ability of the LUT to approximate the true transform. In particular, the output node values do not have to be identical to the true transform value but may be optimized so as to yield lower error overall.

Analytically, node locations as well as node values are desired to be optimized so as to minimize the following cost function:

$$\sum_{i=1}^{T} \|y_i - \hat{f}(x_i, X^{nd}, y^{nd})\|^2 \quad (1)$$

where $$\hat{f}(x_i, X^{nd}, y^{nd}) = \sum_{x_j^{nd} \in N(x_i)} w_j \cdot y_j^{nd} \quad (2)$$

That is, $\hat{f}( )$ is an estimate of the transform value $f( )$ for the training point $x_i$ and is formed by the weighted combinations (an interpolation) of node-output values corresponding to the input node locations that form the vertices of the simplex $N(x_i)$ that encloses $x_i$. A 2-D example is shown in FIG. 6.

Figure 6:
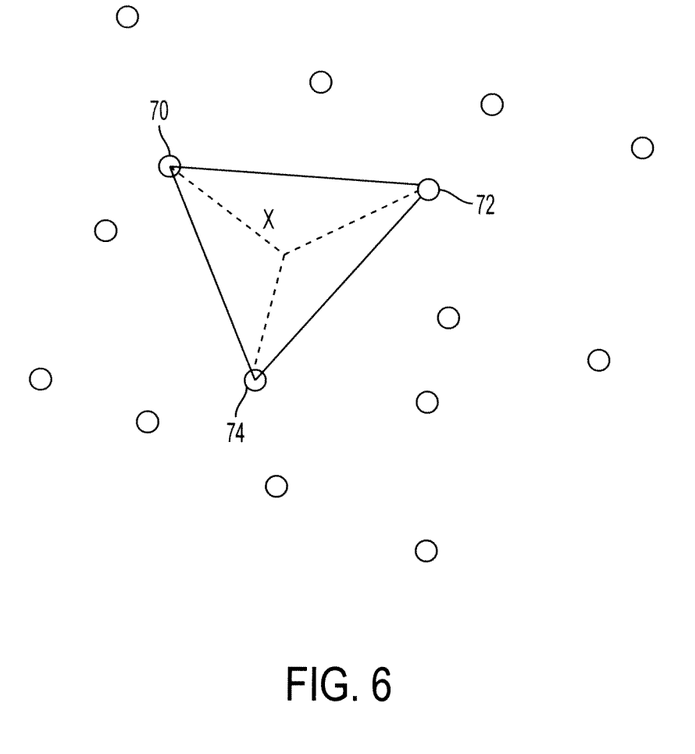
FIG. 6 illustrates a simplex interpolation in 2-D carried out over a set of nodes.

FIG. 6 is an illustration of simplex interpolation in 2-D carried out over a set of nodes. The training point is denoted by "x". As an enclosing simplex is determined, a set of interpolation weights is induced, and the output at "x" is determined as a weighted average of the node values at the simplex vertices 70, 72, 74.

The above formulation suggests that it is possible to write the functional approximation as a linear operator on the vector of node output values $y^{nd}$. In particular, the optimization problem can be re-written as:

$$(X^{nd*}, y^{nd*}) = \arg\min\|y^{tr} - W_{X^{nd}} \cdot y^{nd}\|^2$$

$$y^{tr} \in R^T, W_{X^N} \in R^{T \times M}, y^{nd} \in R^M \quad (3)$$

That is, the goal is to solve for a set of node locations $X^{nd}$ and corresponding node values $y^{nd}$ such that the interpolation error over the statistically representative training set $S=\{X^{tr}, y^{tr}\}$ may be minimized. In Eqn (3), $y^{tr}$ is the T×1 vector of training output values, and $W_{Xnd}$ is a T×M matrix of interpolation weights (determined as a function of $X^{tr}$ and $X^{nd}$) that selectively operates on the entries of the vector of M node output values $y^{nd}$. In particular, the $i^{th}$ row of $W_{Xnd}$, I=1, 2, ..., T contains only n+1 entries that are non-zero (for n-dimensional input nodes) and they correspond to the output node values in $y^{nd}$ of or the enclosing simplex, which contribute to the interpolation.

Algorithm for LUT Design by Jointly Optimizing Node Location and Output Values

Described now is the core aspect of this disclosure, which is the algorithmic framework for optimizing node locations in the input color space as well as the corresponding node output values. Two variants are provided:
1) a one shot sequential optimization of node locations followed by output value optimization; and
2) an iterative algorithm which aims to arrive at a local minima w.r.t for the node locations as well as node values.

The two approaches have complementary merits in cost vs. quality of solution.

Embodiment 1 (FIG. 7): Sequential Optimization of Node Location and ValuE (SOLVE)

Figure 7:
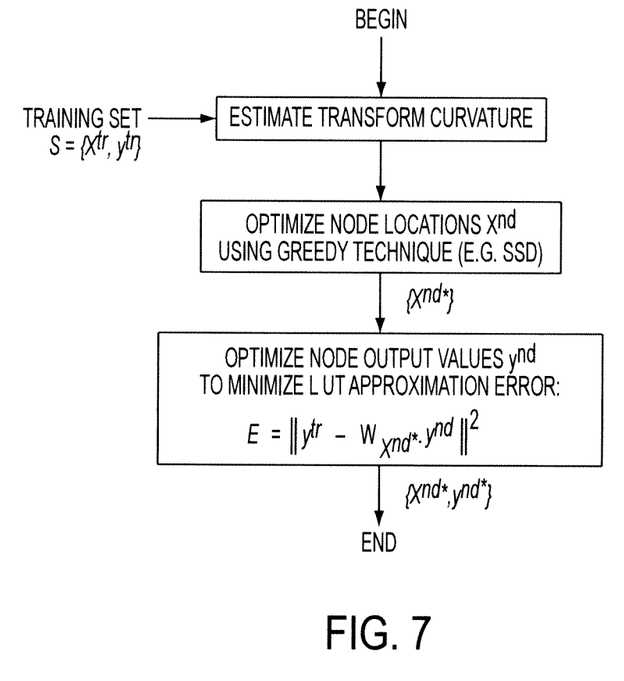
FIG. 7 is a flow chart of a SOLVE algorithm to generate a multidimensional LUT representing a color transformation function according to an exemplary embodiment of this disclosure.

Step 1: Using a training set, estimate the curvature of the transform and optimize node locations using a greedy technique which allocates more nodes in regions of higher transform curvature. (For example, the SSD algorithm in Monga et al., "INPUT-ADAPTIVE METHOD FOR COLOR TABLE LOOKUP," U.S. Patent Application Publication No. 2009/0067017, published Mar. 12, 2009.) Let $X^{nd}*$ denote the optimized node locations.

Step 2: For fixed node locations $X^{nd}*$, solve for the best output node values $y^{nd}*$ by minimizing the squared error:

$$\|y^{tr}-W_{X^{nd}*} \cdot y^{nd}\|^2.$$

For T>M, this is a well-posed convex problem with the minimizer given by:

$$y^{nd*}=(W_{X^{nd}*}^{T} W_{X^{nd}*})^{-1}(W_{X^{nd}*})^{T} y^{tr}$$

Note that the interpolation or weight matrix $W_{X_{nd}}*$ is determined uniquely as the set of nodes $X^{nd}*$ is known.

End: $X^{nd}*$ and $y^{nd}*$ are determined as the node locations and output values respectively.

Embodiment 2 (FIG. 8): REpeated—Sequential Optimization of Node Location and ValuE (RESOLVE)

Figure 8:
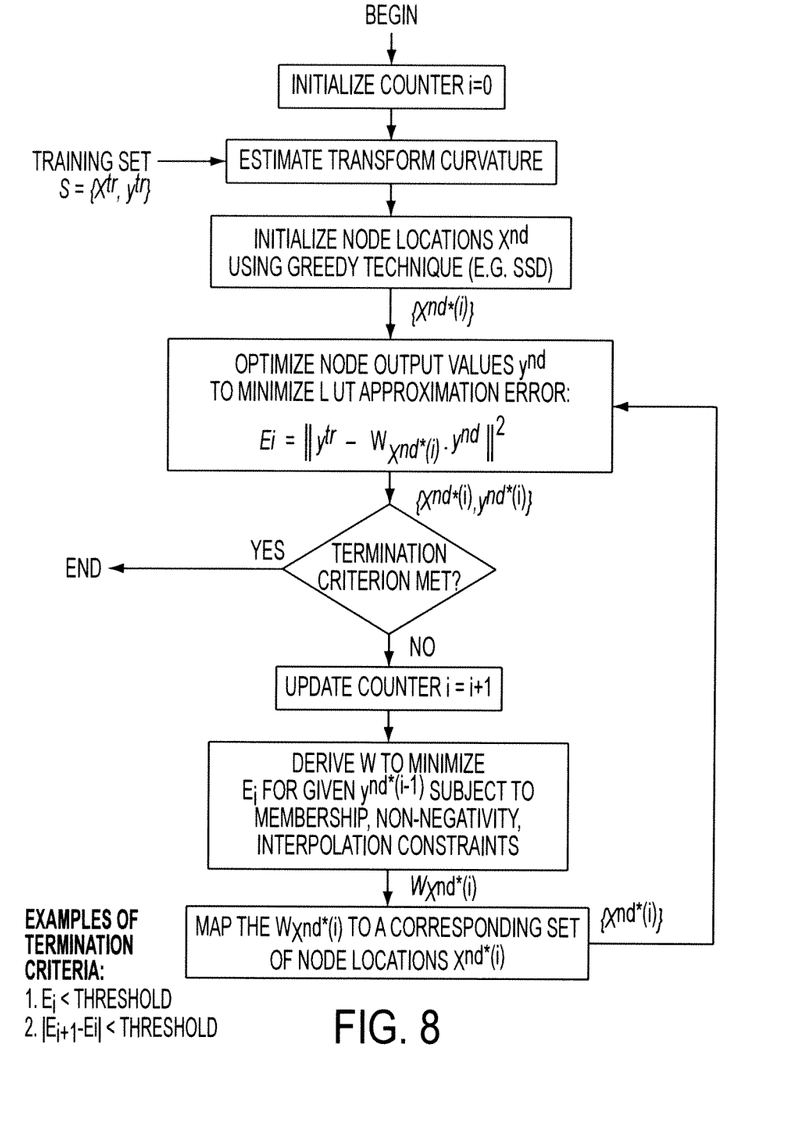
FIG. 8 is a flow chart of a RESOLVE algorithm to generate a multidimensional LUT representing a color transformation function according to an exemplary embodiment of this disclosure.

Step 1: Initialization—same as Step 1 of the SOLVE algorithm.

Step 2: For fixed node locations $X^{nd}*$, solve for the best output node values $y^{nd}*$ by minimizing $$\|y^{tr}-W_{X^{nd}*} \cdot y^{nd}\|^2.$$

For T>M, this is a well-posed convex problem with the minimizer given by:

$$y^{nd*}=(W_{X^{nd}*}^{T} W_{X^{nd}*})^{T} y^{tr}.$$

Note that the interpolation or weight matrix $W_{X_{nd}}*$ is determined uniquely as the set of nodes $X^{nd}*$ is known.

Step 3: Based on the optimized vector of node output values $y^{nd}*$ in Step 2, optimize $W_{X_{nd}}$ so as to minimize the cost function in Eqn (3).

The optimization is carried out subject to the following constraints:

Selection constraint: $w_i^T e_i = 0$, $w_i \in R^M$—ith row of W, $e_i$—membership vector Non-negativity: $w_{ij} \geq 0$, i=1,2, . . . , T, j=1,2, . . . , M.

Interpolation constraint: $W_{X^{nd}} \cdot 1 = 1$, where $1 \in R^M$ is a vector of all 1's.

The first constraint guarantees that any training point for which interpolation weights (and consequently node locations) are optimized maintains membership in the same simplex. $e_i$ therefore is a vector of 1's and 0's with 0's corresponding to non-zero weights in $w_i$ and vice-versa. The second and third constraints account for the fact that the entries of W are interpolation weights—hence they must be non-negative and sum to 1.

Step 4: Map the optimized $W_{X_{nd}}$ to a corresponding set of node locations $X^{nd}$.

It is fairly non-trivial to realize that multiple choices of node locations can lead to the same W—hence this mapping may not be unique. One approach to address this would be to determine the node locations $X^N$ with a distance constraint on the deviation from the pre-existing node locations used in Step 2.

Step 5: Repeat steps 2-4 till no further minimization of the cost function is possible.

Algorithm Characteristics

The SOLVE algorithm is based on the insight that for a fixed set of node locations, a unique minimizer can be obtained in node values—hence the sequential structure with node locations determined first.

The RESOLVE algorithm repeats node location as well as node value optimization steps until convergence to a local minimum is achieved. Such an algorithmic structure is mandated because the cost function is NOT jointly convex in $W_{X_{nd}}$ and $y^{nd}$. That said, the cost function exhibits separable convexity in $W_{X_{nd}}$ and $y^{nd}$, i.e., with one fixed, the resulting optimization problem is convex in the other argument. It must be emphasized that while for a fixed $y^{nd}$ a convex problem is obtained in $W_{X_{nd}}$—this does not necessarily imply convexity in $X^{nd}$.

From the viewpoint of minimizing overall function approximation error the RESOLVE algorithm will always be superior to the SOLVE algorithm BUT the SOLVE algorithm has the benefit of yielding LUTs on a regular lattice. In particular, the node location optimization algorithm in Step 1 of SOLVE can be designed to necessarily yield nodes on a lattice.

Experimental Results

In order to demonstrate the virtues of optimizing both node locations and values, we carried out the following experiment pertaining to the first embodiment (SOLVE). A CMYK→Lab transform for a particular printing device was approximated by a 8^4 LUT. Because the availability of the true transform is impractical for problems like this, a very high resolution (33^4) CMY→Lab LUT was first designed by printing and measuring about 1500 CMYK patches, and this was treated as the true transform. An independent set of 216 test CMYK values spanning the printer gamut was processed through the high-resolution LUT to obtain "ground truth" CIELAB values. The same CMYK values were then processed through a given low-resolution LUT approximation, and the output was compared against the ground-truth in terms of the CIE76 ΔE metric.

Table 1 demonstrates the benefits of optimizing both node location and node value vs. standard uniform LUT design and individual optimization of either LUT node locations or output values at those nodes for fixed uniform node placement. As is indicated in the table, the improvement is quite significant.

TABLE 1

Benefits of optimizing both node location and value in approximating a forward printer color transform from CMYK to CIELAB

| Node location strategy | Node value strategy | CIE76 ΔE between high-res transform and low-res approximation | | |
| --- | --- | --- | --- | --- |
| | | Avg ΔE | 95th percentile | Maximum ΔE |
| Uniform | Coincide with high-resolution LUT | 6.2 | 8.2 | 13.25 |
| Non-uniform, derived via "Select-Sort-Damp" | Coincide with high-resolution LUT | 4.1 | 7.4 | 11.01 |
| Uniform | Least-squares optimization | 5.6 | 7.89 | 13.25 |
| SOLVE | SOLVE | 2.95 | 6.1 | 10.92 |

Figure 9:
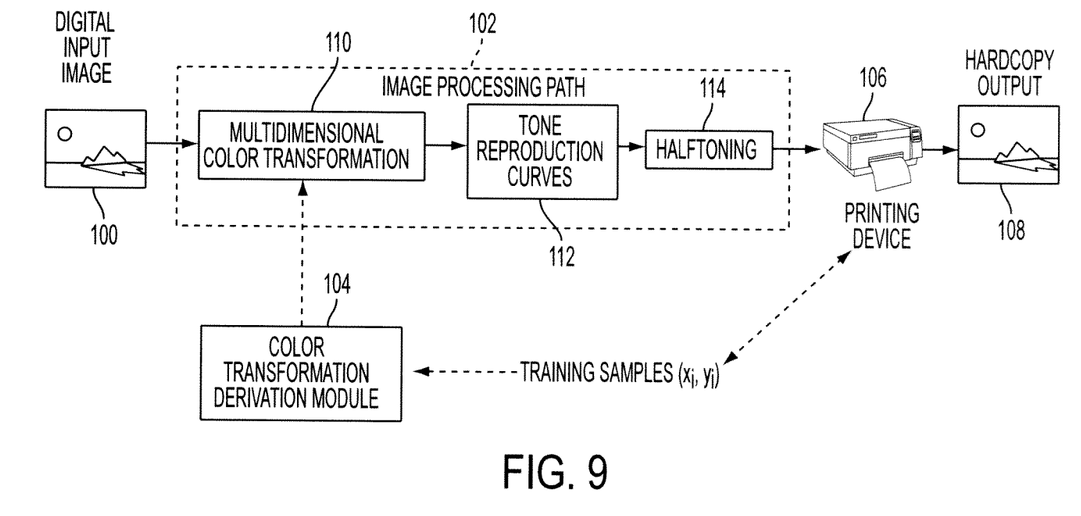
FIG. 9 illustrates an image processing system according to an exemplary embodiment of this disclosure.

With reference to FIG. 9, illustrated is a block diagram of an image processing system using an exemplary method as discussed hereto.

In operation, the printing system receives a digital input 100, represented in device independent color space, and processes 102 the device independent color space representation of the digital input image 100 to generate a pixel representation of the digital input image suitable for printing on printing device 106 to generate a hardcopy output 108 of the digital input image 100.

The image processing path 102 can reside and be executed on a DFE (Digital Front End), and/or the printing device 106. However, as will be understood by those of skill in the art, any computer related device capable of executing instructions can be used to process the image data.

As shown in FIG. 9, the image processing path includes a multidimensional color transformation look-up-table generated by one of the SOLVE and RESOLVE algorithms discussed above and represented by the color transformation derivation module to produce device dependent color space representations of the digital input image. The training data used to derive the multidimensional color transformation is obtained via a process of printing and measuring a characterization target with known device color values. (See R. Bala, "DEVICE CHARACTERIZATION," *Digital Color Imaging Handbook*, Chapter 5, CRC Press, 2003.)

After the digital input image is processed by the multidimensional color transformation module to produce device dependent color space representations of the digital input image, the image data is processed according to specific tone reproduction curves 112 and halftoning algorithms 114 to generate pixel data to be rendered on the printing device 106.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of generating a multidimensional LUT (look-up-table) representing a color transformation function associated with an imaging device, the method comprising:
   a) generating a set of LUT node locations by solving a first optimization problem to minimize a first defined error criterion calculated over a set of training samples associated with the color transformation function, the set of LUT node locations allocating more nodes in regions of the color transformation function including a higher curvature relative to other regions of the color transformation function;
   b) generating a set of LUT node values associated with the respective LUT node locations generated in step a) by solving a second optimization problem to minimize a second defined error criterion calculated over the set of training samples, the second error criterion accounting for one or more interpolation processes associated with determining LUT values at LUT non-nodal locations;
   c) generating a second set of LUT node locations by solving a third optimization problem as a function of the set of LUT node values generated in step b);
   d) repeating step b) to generate a second set of LUT node values associated with the second of LUT node locations, and
   iteratively performing steps c) and d) based on LUT node values and locations determined in the previous iteration, until a termination condition is satisfied, wherein solving the third optimization problem of step c) includes:
minimizing the cost function $$X^{nd*}=\arg\min\|y^{tr}-W_{X^{nd}}\cdot y^{nd}\|^2$$

$$y^{tr}\in R^T, W_{X^{nd}}\in R^{T\times M}, y^{nd}\in R^M,$$

where T=no. of training samples; M=no. of LUT nodes
$W_{X_{nd}}$ is a T×M matrix,
$X^{nd*}$ represents the optimized set of LUT node locations,
the training set S={$X^{tr}, y^{tr}$},
$y^{nd}$ represents the set of LUT node values generated in a previous step; and
the optimization includes the following constraints:
Selection constraint : $w_i^T e_i=0$, $w_i \in R^M$—ith row of W, $e_i$—membership vector
Non-negativity: $w_{ij}\geq 0$, i=1,2, . . . , T, j=1,2, . . . , M
Interpolation constraint: $W_{X^{nd}}\cdot 1=1$, where $1\in R^M$ is a vector of all 1's; and
mapping the optimized $W_{X_{nd}}$ to the corresponding set of LUT node locations $X^{nd}$.

2. The method according to claim 1, wherein the generated LUT is associated with one of a printer, an image output display, a scanner and a camera.

3. The method according to claim 1, wherein solving the second optimization problem of steps d) and b) includes minimizing the function $$y^{nd*}=\arg\min\|y^{tr}-W_{X^{nd*}}\cdot y^{nd}\|^2, \text{ where}$$

T=no. of training samples; M=no. of LUT nodes
$W_{X_{nd}}$ is a T×M matrix
$X^{nd*}$ represents the set of LUT node locations,
the training set S={$X^{tr}, y^{tr}$},
$y^{nd}$ represents the set of LUT node values, and
$y^{nd*}$ represents the optimized LUT node values.

4. The method according to claim 3, further comprising:
iteratively performing steps c) and d) based on LUT node values and locations determined in the previous iteration, until no further minimization of the cost function is possible.

5. The method according to claim 1, further comprising:
receiving a data representation of an image to be rendered on the imaging device;
processing the data representation to generate a device dependent data representation of the image by accessing the generated multidimensional LUT representing the color transformation associated with the imaging device, whereby an interpolation process is used to generate the device dependent data representations of the image for image colors not associated with a LUT node location; and
rendering the image on the imaging device using the device dependent data representation of the image.

6. The method according to claim 1, wherein step a) uses a Select-Sort-Damp (SSD) process as a function of the curvature of the color transformation function to generate the set of LUT node locations.

7. A method of generating a multidimensional LUT (look-up-table) representing a color transformation function associated with an imaging device, the method comprising:
   a) generating a set of LUT node locations by solving a first optimization problem to minimize a first defined error criterion calculated over a set of training samples associated with the color transformation function, the set of LUT node locations allocating more nodes in regions of the color transformation function including a higher curvature relative to other regions of the color transformation function; and b) generating a set of LUT node values associated with the respective LUT node locations generated in step a) by solving a second optimization problem to minimize a second defined error criterion calculated over the set of training samples, the second error criterion accounting for one or more interpolation processes associated with determining LUT values at LUT non-nodal locations, wherein solving the second optimization problem of step b) includes minimizing the function $$\|y^{tr}-W_{X^{nd}}*\cdot y^{nd}\|^2, \text{ where}$$

T=no. of training samples; M=no. of LUT nodes
$W_{X_{nd}}$ is a T×M matrix
$X^{nd*}$ represents the set of LUT node locations,
the training set S={$X^{tr}$, $y^{tr}$},
$y^{nd}$ represents the set of LUT node values, and
$y^{nd*}$ represents the optimized LUT node values.

8. The method according to claim 7, wherein $$T>M, \text{ and } y^{nd*}=(W_{X^{nd}*}^T W_{X^{nd}*})^{-1}(W_{X^{nd}*})^T y^{tr}.$$

9. A printing apparatus comprising:
an image marking device;
a controller operatively connected to the image marking device, the controller configured to access a multidimensional LUT (look-up table) representing a color transformation function associated with rendering an image on the image marking device, wherein the multidimensional LUT is generated by a process comprising:
a) generating a set of LUT node locations by solving a first optimization problem to minimize a first defined error criterion calculated over a set of training samples associated with the color transformation function, the set of LUT node locations allocating more nodes in regions of the color transformation function including a higher curvature relative to other regions of the color transformation function;
b) generating a set of LUT node values associated with the respective LUT node locations generated in step a) by solving a second optimization problem to minimize a second defined error criterion calculated over the set of training samples, the second error criterion accounting for one or more interpolation processes associated with determining LUT values at LUT non-nodal locations;
c) generating a second set of LUT node locations by solving a third optimization problem as a function of the set of LUT node values generated in step b);
d) repeating step b) to generate a second set of LUT node values associated with the second of LUT node locations, and iteratively performing steps c) and d) based on LUT node values and locations determined in the previous iteration, until a termination condition is satisfied, wherein solving the third optimization problem of step c) includes:
minimizing the cost function $$X^{nd*}=\arg\min\|y^{tr}-W_{X^{nd}}\cdot y^{nd}\|^2$$

$$y^{tr} \in R^T, W_{X^{nd}} \in R^{T\times M}, y^{nd} \in R^M,$$

where T=no. of training samples; M=no. of LUT nodes
$W_{X_{nd}}$ is a T×M matrix,
$X^{nd*}$ represents the optimized set of LUT node locations,
the training set S={$X^{tr}$, $y^{tr}$},
$y^{nd}$ represents the set of LUT node values generated in a previous step; and
the optimization includes the following constraints:
Selection constraint: $w_i^T e_i = 0$, $w_i \in R^M$—ith row of W, $e_i$—membership vector Non-negativity: $w_{ij} \geq 0$, i=1,2,..., T, j=1,2,..., M
Interpolation constraint: $W_{X^{nd}} \cdot 1 = 1$, where $1 \in R^M$ is a vector of all 1's; and
mapping the optimized $W_{X_{nd}}$ to the corresponding set of LUT node locations $X^{nd}$.

10. The printing apparatus according to claim 9, wherein solving the second optimization problem of step b) includes minimizing the function $$y^{nd*}=\arg\min\|y^{tr}-W_{X^{nd}*}\cdot y^{nd}\|^2, \text{ where}$$

T=no. of training samples; M=no. of LUT nodes
$W_{X_{nd}}$ is a T×M matrix
$X^{nd*}$ represents the set of LUT node locations,
the training set S={$X^{tr}$, $y^{tr}$},
$y^{nd}$ represents the set of LUT node values, and
$y^{nd*}$ represents the optimized LUT node values.

11. The printing apparatus according to claim 10, the process further comprising:
iteratively performing steps c) and d) based on LUT node values and locations determined in the previous iteration, until no further minimization of the cost function is possible.

12. The printing apparatus according to claim 9, the process further comprising:
receiving a data representation of an image to be rendered on the imaging device;
processing the data representation to generate a device dependent data representation of the image by accessing the generated multidimensional LUT representing the color transformation associated with the imaging device, whereby an interpolation process is used to generate the device dependent data representations of the image for image colors not associated with a LUT node location; and
rendering the image on the imaging device using the device dependent data representation of the image.

13. The printing apparatus according to claim 9, wherein step a) uses a Select-Sort-Damp (SSD) process as a function of the curvature of the color transformation function to generate the set of LUT node locations.

14. A printing apparatus comprising:
an image marking device;
a controller operatively connected to the image marking device, the controller configured to access a multidimensional LUT (look-up table) representing a color transformation function associated with rendering an image on the image marking device, wherein the multidimensional LUT is generated by a process comprising:
a) generating a set of LUT node locations by solving a first optimization problem to minimize a first defined error criterion calculated over a set of training samples associated with the color transformation function, the set of LUT node locations allocating more nodes in regions of the color transformation function including a higher curvature relative to other regions of the color transformation function; and
b) generating a set of LUT node values associated with the respective LUT node locations generated in step a) by solving a second optimization problem to minimize a second defined error criterion calculated over the set of training samples, the second error criterion accounting for one or more interpolation processes associated with determining LUT values at LUT non-nodal locations, wherein solving the second optimization problem of step b) includes minimizing the function $$\|y^{tr}-W_{X^{nd}*}\cdot y^{nd}\|^2, \text{ where}$$

$W_{X_{nd}}$ is a T×M matrix $X^{nd*}$ represents the set of LUT node locations, the training set $S=\{X^{tr}, y^{tr}\}$, and $y^{nd}$ represents the set of LUT node values.

15. The printing apparatus according to claim 14, wherein $T>M$, and $y^{nd*}=(W_{X^{nd*}}^T W_{X^{nd*}})^{-1} y^{tr}$.

16. A computer program product comprising:
a non-transitory computer readable medium storing instructions that, when executed by a computer, cause the computer to perform a process of generating a multidimensional LUT (look-up table) representing a color transformation function associated with an imaging device, the process comprising:
   a) generating a set of LUT node locations by solving a first optimization problem to minimize a first defined error criterion calculated over a set of training samples associated with the color transformation function, the set of LUT node locations allocating more nodes in regions of the color transformation function including a higher curvature relative to other regions of the color transformation function;
   b) generating a set of LUT node values associated with the respective LUT node locations generated in step a) by solving a second optimization problem to minimize a second defined error criterion calculated over the set of training samples, the second error criterion accounting for one or more interpolation processes associated with determining LUT values at LUT non-nodal locations;
   c) generating a second set of LUT node locations by solving a third optimization problem as a function of the set of LUT node values generated in step b);
   d) repeating step b) to generate a second set of LUT node values associated with the second of LUT node locations, and
iteratively performing steps c) and d) until a termination condition is satisfied, wherein solving the third optimization problem of step c) includes:
minimizing the cost function $X^{nd*} = \arg\min \|y^{tr} - W_{X^{nd}} \cdot y^{nd}\|^2$ $y^{tr} \in R^T, W_{X^{nd}} \in R^{T \times M}, y^{nd} \in R^M$, where T=no. of training samples; M=no. of LUT nodes $W_{X_{nd}}$ is a T×M matrix, $X^{nd*}$ represents the optimized set of LUT node locations, the training set $S=\{X^{tr}, y^{tr}\}$, $y^{nd}$ represents the set of LUT node values generated in a previous step; and the optimization includes the following constraints:

Selection constraint: $w_i^T e_i = 0$, $w_i \in R^M$—ith row of W, $e_i$—membership vector Non-negativity: $w_{ij} \geq 0$, i=1,2,...,T, j=1,2,...,M Interpolation constraint: $W_{X^{nd}} \cdot 1 = 1$, where $1 \in R^M$ is a vector of all 1's; and mapping the optimized $W_{X_{nd}}$ to the corresponding set of LUT node locations $X^{nd}$.

17. The computer program product according to claim 16, wherein the generated LUT is associated with one of a printer, an image output display, a scanner and a camera.

18. A computer program product comprising:
a non-transitory computer readable medium storing instructions that, when executed by a computer, cause the computer to perform a process of generating a multidimensional LUT (look-up table) representing a color transformation function associated with an imaging device, the process comprising:
   a) generating a set of LUT node locations by solving a first optimization problem to minimize a first defined error criterion calculated over a set of training samples associated with the color transformation function, the set of LUT node locations allocating more nodes in regions of the color transformation function including a higher curvature relative to other regions of the color transformation function; and
   b) generating a set of LUT node values associated with the respective LUT node locations generated in step a) by solving a second optimization problem to minimize a second defined error criterion calculated over the set of training samples, the second error criterion accounting for one or more interpolation processes associated with determining LUT values at LUT non-nodal locations wherein solving the second optimization problem of step b) includes minimizing the function $\|y^{tr} - W_{X^{nd*}} \cdot y^{nd}\|^2$, where T=no. of training samples; M=no. of LUT nodes $W_{X_{nd}}$ is a T×M matrix $X^{nd*}$ represents the set of LUT node locations, the training set $S=\{X^{tr}, y^{tr}\}$, $y^{nd}$ represents the set of LUT node values, and $y^{nd*}$ represents the optimized LUT node values.

* * * * *